(12) United States Patent
Hughes et al.

(10) Patent No.: US 11,735,051 B2
(45) Date of Patent: Aug. 22, 2023

(54) DETECTION OF BICYCLISTS NEAR EGO VEHICLES

(71) Applicant: TOYOTA RESEARCH INSTITUTE, INC., Los Altos, CA (US)

(72) Inventors: Stephen Hughes, Redwood City, CA (US); Erik C. Sobel, Newton, MA (US); Todd J. Rowell, Arlington, MA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 550 days.

(21) Appl. No.: 16/833,004

(22) Filed: Mar. 27, 2020

(65) Prior Publication Data
US 2021/0304611 A1 Sep. 30, 2021

(51) Int. Cl.
| | | |
|---|---|---|
| *G08G 1/16* | (2006.01) | |
| *B60Q 9/00* | (2006.01) | |
| *B60R 1/12* | (2006.01) | |
| *G05D 1/00* | (2006.01) | |
| *G08G 1/015* | (2006.01) | |
| *E05F 15/73* | (2015.01) | |
| *B60K 35/00* | (2006.01) | |
| *G08G 1/01* | (2006.01) | |
| *G08G 1/0962* | (2006.01) | |

(Continued)

(52) U.S. Cl.
CPC ............ *G08G 1/166* (2013.01); *B60K 35/00* (2013.01); *B60Q 9/00* (2013.01); *B60R 1/12* (2013.01); *E05F 15/73* (2015.01); *G05D 1/0055* (2013.01); *G05D 1/0214* (2013.01); *G06V 40/103* (2022.01); *G08G 1/015* (2013.01); *G08G 1/0112* (2013.01); *G08G 1/0116* (2013.01); *G08G 1/0962* (2013.01); *G08G 1/164* (2013.01); *B60K 2370/1529* (2019.05); *B60K 2370/193* (2019.05); *B60R 2001/1215* (2013.01); *E05F 2015/767* (2015.01); *E05Y 2400/53* (2013.01); *E05Y 2400/818* (2013.01); *E05Y 2900/531* (2013.01); *G05D 2201/0213* (2013.01)

(58) Field of Classification Search
None
See application file for complete search history.

(56) References Cited

U.S. PATENT DOCUMENTS

| | | | |
|---|---|---|---|
| 9,418,546 B1 * | 8/2016 | Whiting | G08G 1/0133 |
| 9,845,048 B1 * | 12/2017 | Tseng | G08G 1/166 |
| 10,219,571 B1 * | 3/2019 | Aloumanis | G08G 1/167 |

(Continued)

FOREIGN PATENT DOCUMENTS

WO 2016115259 A1 7/2016

OTHER PUBLICATIONS

Charlotte, "Volvo Connecting Cars & Cyclists for Safer Mobility", tu-auto.com, Apr. 2, 2015, pp. 1-8.

*Primary Examiner* — Muhammad Adnan
(74) *Attorney, Agent, or Firm* — Seyfarth Shaw LLP

(57) ABSTRACT

A method for alerting a driver when a cyclist is detected near an ego vehicle is described. The method includes detecting a presence of an object proximate the ego vehicle. The method also includes identifying the object as the cyclist according to geometric characteristics and/or speed data of the detected object. The method further includes displaying a graphical indication of the cyclist on a passenger side/driver side mirror of the ego vehicle while the cyclist is in a blind spot of the ego vehicle.

18 Claims, 8 Drawing Sheets

(51) Int. Cl.
*G05D 1/02* (2020.01)
*G06V 40/10* (2022.01)

(56) References Cited

U.S. PATENT DOCUMENTS

| | | | | |
|---|---|---|---|---|
| 10,282,981 | B1* | 5/2019 | Nepomuceno | G08G 1/163 |
| 10,421,399 | B2 | 9/2019 | Alarcon et al. | |
| 11,189,173 | B1* | 11/2021 | Esselink | G08G 1/166 |
| 2006/0244635 | A1* | 11/2006 | Chavarria | B60Q 1/503 |
| | | | | 340/944 |
| 2006/0290482 | A1* | 12/2006 | Matsumoto | G08G 1/165 |
| | | | | 340/436 |
| 2010/0205132 | A1* | 8/2010 | Taguchi | G08G 1/166 |
| | | | | 706/46 |
| 2012/0154591 | A1* | 6/2012 | Baur | H04N 7/183 |
| | | | | 348/148 |
| 2012/0293357 | A1* | 11/2012 | Nishigaki | G01S 17/931 |
| | | | | 342/52 |
| 2013/0127638 | A1* | 5/2013 | Harrison | G08G 1/166 |
| | | | | 340/903 |
| 2013/0194127 | A1 | 8/2013 | Ishihara et al. | |
| 2014/0236414 | A1* | 8/2014 | Droz | G08G 1/015 |
| | | | | 701/1 |
| 2014/0266806 | A1* | 9/2014 | Gao | G08G 1/04 |
| | | | | 340/937 |
| 2015/0251599 | A1* | 9/2015 | Koravadi | G01S 19/42 |
| | | | | 340/903 |
| 2015/0269844 | A1* | 9/2015 | Arndt | G08G 1/052 |
| | | | | 340/435 |
| 2016/0005312 | A1* | 1/2016 | Gao | G08G 1/04 |
| | | | | 340/937 |
| 2017/0080952 | A1* | 3/2017 | Gupta | G08G 1/167 |
| 2017/0113512 | A1* | 4/2017 | Park | G06V 40/18 |
| 2017/0268896 | A1* | 9/2017 | Bai | G08G 1/0141 |
| 2017/0292848 | A1* | 10/2017 | Nepomuceno | G01C 21/3492 |
| 2017/0309174 | A1* | 10/2017 | Gonzales | G08B 21/02 |
| 2018/0075747 | A1* | 3/2018 | Pahwa | B60W 40/10 |
| 2018/0286232 | A1* | 10/2018 | Shau | G08G 1/005 |
| 2018/0336787 | A1* | 11/2018 | Ohnishi | G06V 20/56 |
| 2019/0101634 | A1* | 4/2019 | Baheti | G01S 13/62 |
| 2019/0179006 | A1* | 6/2019 | Baba | G06V 20/58 |
| 2019/0202358 | A1* | 7/2019 | Arndt | B60Q 9/008 |
| 2019/0259283 | A1 | 8/2019 | Sung et al. | |
| 2019/0271777 | A1* | 9/2019 | Hiromitsu | G01S 13/931 |
| 2019/0283671 | A1* | 9/2019 | Shimomura | B60W 30/143 |
| 2019/0287282 | A1* | 9/2019 | Mohan | B60R 1/12 |
| 2019/0351823 | A1* | 11/2019 | Van Der Meijs | B60K 35/00 |
| 2020/0008028 | A1* | 1/2020 | Yang | G08G 1/0175 |
| 2020/0062277 | A1* | 2/2020 | Kim | G01S 13/931 |
| 2020/0223352 | A1* | 7/2020 | Toshio Kimura | B60Q 1/547 |
| 2020/0242374 | A1* | 7/2020 | Nakazawa | B60R 11/04 |
| 2020/0369338 | A1* | 11/2020 | Strothmann | G08G 1/22 |
| 2021/0129748 | A1* | 5/2021 | Tamrakar | A61B 5/1103 |
| 2021/0179128 | A1* | 6/2021 | Collyer | G06V 20/58 |
| 2021/0370823 | A1* | 12/2021 | Stein | G08G 1/005 |
| 2022/0172607 | A1* | 6/2022 | Guan | G08G 1/017 |

* cited by examiner

DETECTION OF BICYCLISTS NEAR EGO VEHICLES

BACKGROUND

Field

Certain aspects of the present disclosure generally relate to safety vehicle applications and, more particularly, a system and method of alerting a driver when a cyclist is detected near ego vehicles.

Background

Each year thousands of accidents occur on roadways worldwide. These accidents often result in a significant number of injuries and fatalities to bicyclists and motorcyclists on the roadways. In particular, the majority of these injuries and fatalities are caused by accidents between cyclists and motor vehicles, such as cars or trucks. In spite of occurring at low speeds, collisions between cyclists and motor vehicles can result in catastrophic injuries, including paralysis and death Typically such accidents occur because the driver of the motor vehicle did not see the cyclist.

The National Highway Traffic Safety Administration (NHTSA) has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. In a Level 0 vehicle, the set of advanced driver-assistance system (ADAS) features installed in the vehicle provide no vehicle control, but may issue warnings to the driver of the vehicle.

An ADAS feature to alert a driver when a cyclist is detected near an ego vehicle is desired.

SUMMARY

A method for alerting a driver when a cyclist is detected near an ego vehicle is described. The method includes detecting a presence of an object proximate the ego vehicle. The method also includes identifying the object as the cyclist according to geometric characteristics and/or speed data of the detected object. The method further includes displaying a graphical indication of the cyclist on a passenger side/driver side mirror of the ego vehicle while the cyclist is in a blind spot of the ego vehicle.

A non-transitory computer-readable medium having program code recorded thereon for alerting a driver when a cyclist is detected near an ego vehicle is described. The program code recorded on non-transitory computer-readable medium is executed by a processor. The non-transitory computer-readable medium includes program code to detect a presence of an object proximate the ego vehicle. The non-transitory computer-readable medium also includes program code to identify the object as the cyclist according to geometric characteristics and/or speed data of the detected object. The non-transitory computer-readable medium further includes program code to display a graphical indication of the cyclist on a passenger side/driver side mirror of the ego vehicle while the cyclist is in a blind spot of the ego vehicle.

A system for alerting a driver when a cyclist is detected near an ego vehicle is described. The system includes a cyclist detection module configured to detect a presence of an object proximate the ego vehicle and to identify the object as the cyclist according to geometric characteristics and/or speed data of the detected object. The system also includes an advanced driver-assistance system (ADAS) configured to display a graphical indication of the cyclist on a passenger side/driver side mirror of the ego vehicle while the cyclist is in a blind spot of the ego vehicle.

This has outlined, rather broadly, the features and technical advantages of the present disclosure in order that the detailed description that follows may be better understood. Additional features and advantages of the present disclosure will be described below. It should be appreciated by those skilled in the art that the present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
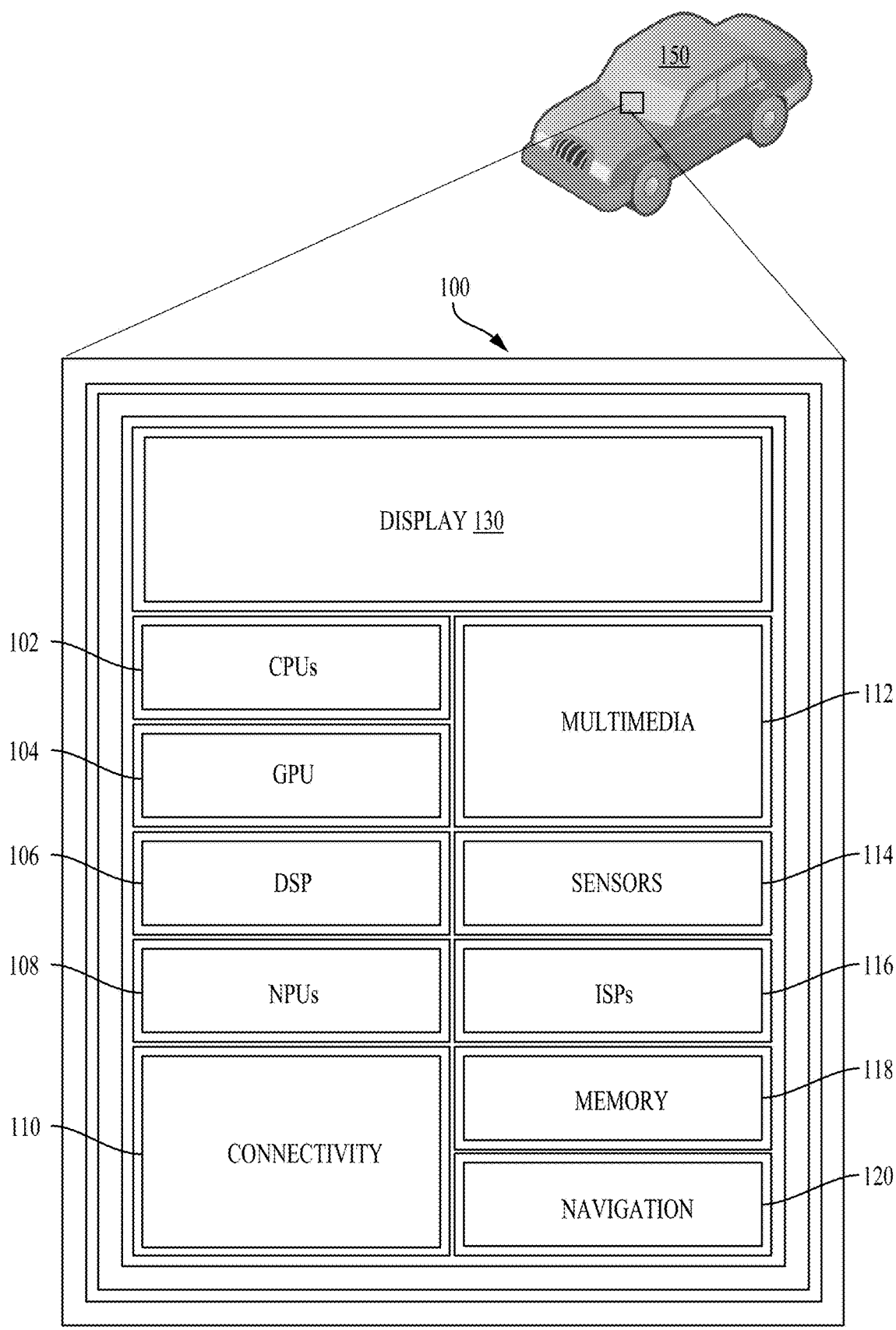
FIG. 1 illustrates an example implementation of designing a system using a system-on-a-chip (SOC) for alerting a driver when a cyclist is detected near an ego vehicle, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

Autonomous agents, such as driverless cars and robots, are quickly evolving and becoming a reality in this decade. Unfortunately, because autonomous agents have to interact with humans, many critical concerns arise. For example, one critical concern involves the prevention of collisions between vehicles and cyclists, which are increasingly forced to share the road. In a Level 0 non-autonomous vehicle, a set of advanced driver-assistance system (ADAS) features installed in the vehicle provide no vehicle control, but may issue warnings to the driver of the vehicle. According to aspects of the present disclosure, an ADAS feature to alert a driver when a cyclist is detected near an ego vehicle is desired.

Aspects of the present disclosure are directed to a vehicle system configured to detect the presence of a cyclist in a blind spot of an ego vehicle and alert the driver. For example, the vehicle system may generate an indications/alert (e.g., a graphical representation of a bicyclist on a passenger/driver side mirror) representing the presence of the bicyclist in a blind spot of the vehicle. In particular, the vehicle system is configured to detect the presence and geometric characteristics (e.g., size) of an object in a blind spot of the vehicle. Capturing image data to enable detecting the presence and geometric characteristics of a blind spot object may be performed using various sensors (e.g., a LIDAR sensor, a radar sensor, an imaging sensor, or other like sensor).

According to aspects of the present disclosure, the vehicle system may obtain speed data of the detected object in the blind spot of the vehicle (e.g., blind spot object). If detected speed data and geometric characteristics correspond to the presence of a cyclist, the vehicle system may detect a bicyclist in the blind spot of the vehicle. In response, the vehicle system generates an alert/indication to a driver, such as the graphical representation of a bicyclist on a passenger/driver side mirror. Although this example assumes the detected bicyclist is unconnected, in other configurations of the vehicle system, the detected bicyclist is a connected bicyclist, in which a third party application tracks the location of the detected bicyclist. In this configuration, a blind spot object having a position matching a connected bicyclist is identified as the detected bicyclist using the third party application.

One aspect of the present disclosure enables vehicle systems to obtain third-party application information indicating the location and/or trajectory of a bicyclist in order to identify and alert a driver of an upcoming bicyclist. In this aspect of the present disclosure, a vehicle system may be configured to obtain third-party application information indicating the location and/or trajectory of one or more cyclists. By comparing the obtained application information to the location information of the ego vehicle (e.g., GPS coordinates) and/or trajectory information of the ego vehicle, the vehicle system can determine whether the ego vehicle is nearby and/or approaching one or more cyclists.

In response to determining that the ego vehicle is nearby and/or approaching one or more bicyclists, a display system of the vehicle (e.g., a heads-up-display (HUD)) may generate an indication/alert corresponding to the one or more identified bicyclists. By identifying the presence of one or more upcoming bicyclists, the likelihood that a collision will occur between a bicyclist and the subject vehicle substantially decreases. In one configuration, an alert/indication generated by the vehicle system may represent the presence of the detected bicyclist. For example, a passenger/driver side mirror of an ego vehicle may generate a graphical indication corresponding to a bicyclist in response to the detected bicyclist.

FIG. 1 illustrates an example implementation of the aforementioned system and method for alerting a driver when a cyclist is detected near an ego vehicle using a system-on-a-chip (SOC) 100 of an ego vehicle 150. The SOC 100 may include a single processor or multi-core processors (e.g., a central processing unit (CPU) 102), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fourth generation long term evolution (4G LTE) connectivity, unlicensed Wi-Fi connectivity, USB connectivity, Bluetooth® connectivity, and the like. In addition, a multimedia processor 112 in combination with a display 130 may, for example, classify and categorize poses of objects in an area of interest, according to the display 130 illustrating a view of a vehicle. In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system.

The SOC 100 may be based on an Advanced Risk Machine (ARM) instruction set or the like. In another aspect of the present disclosure, the SOC 100 may be a server computer in communication with the ego vehicle 150. In this arrangement, the ego vehicle 150 may include a processor and other features of the SOC 100. In this aspect of the present disclosure, instructions loaded into a processor (e.g., CPU 102) or the NPU 108 of the ego vehicle 150 may include code for alerting a driver when a cyclist is detected near an ego vehicle in an image captured by the sensor processor 114. The instructions loaded into a processor (e.g., CPU 102) may also include code for planning and control (e.g., intention prediction of the ego vehicle) in response to detecting a cyclist near the ego vehicle based on an image captured by the sensor processor 114.

Figure 2:
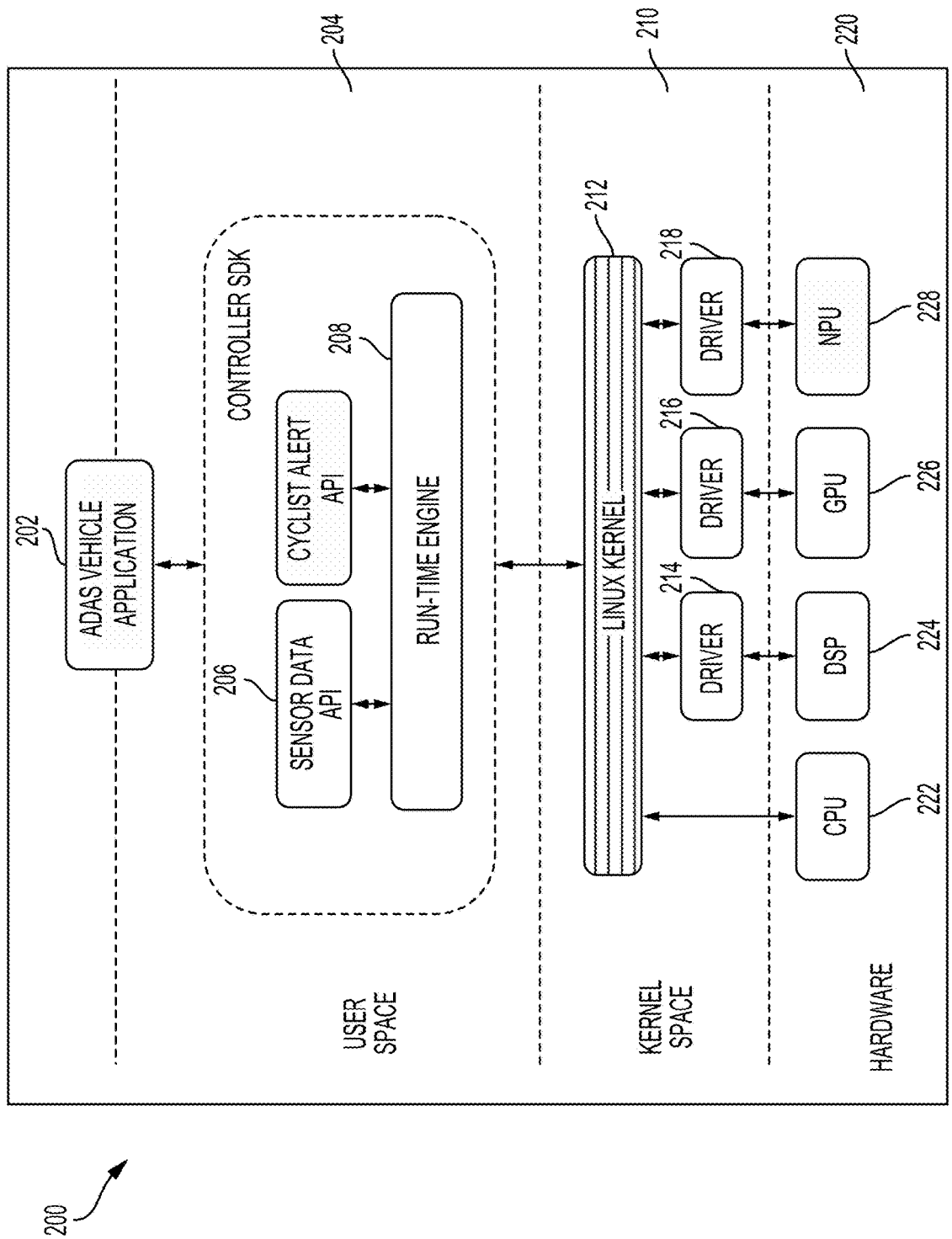
FIG. 2 is a block diagram illustrating a software architecture that may modularize functions for alerting a driver when a cyclist is detected near an ego vehicle, according to aspects of the present disclosure.

FIG. 2 is a block diagram illustrating a software architecture 200 that may modularize functions for planning and control of an ego vehicle for alerting a driver when a cyclist is detected near an ego vehicle, according to aspects of the present disclosure. Using the architecture, a cyclist alert application 202 may be designed such that it may cause various processing blocks of an SOC 220 (for example a CPU 222, a DSP 224, a GPU 226, and/or an NPU 228) to perform supporting computations during run-time operation of the cyclist alert application 202.

The cyclist alert application 202 may be configured to call functions defined in a user space 204 that may, for example, provide for alerting a driver when a cyclist is detected near an ego vehicle. The cyclist alert application 202 may make a request to compile program code associated with a library defined in a sensor data application programming interface (API) 206 to detect the presence of a cyclist in a blind spot of an ego vehicle and alert the driver.

A run-time engine 208, which may be compiled code of a runtime framework, may be further accessible to the cyclist alert application 202. The cyclist alert application 202 may cause the run-time engine 208, for example, to take actions for blind spot detection of a cyclist. When an object is detected within a predetermined distance of the ego vehicle, the run-time engine 208 may in turn send a signal to an operating system 210, such as a Linux Kernel 212, running on the SOC 220. The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Figure 3:
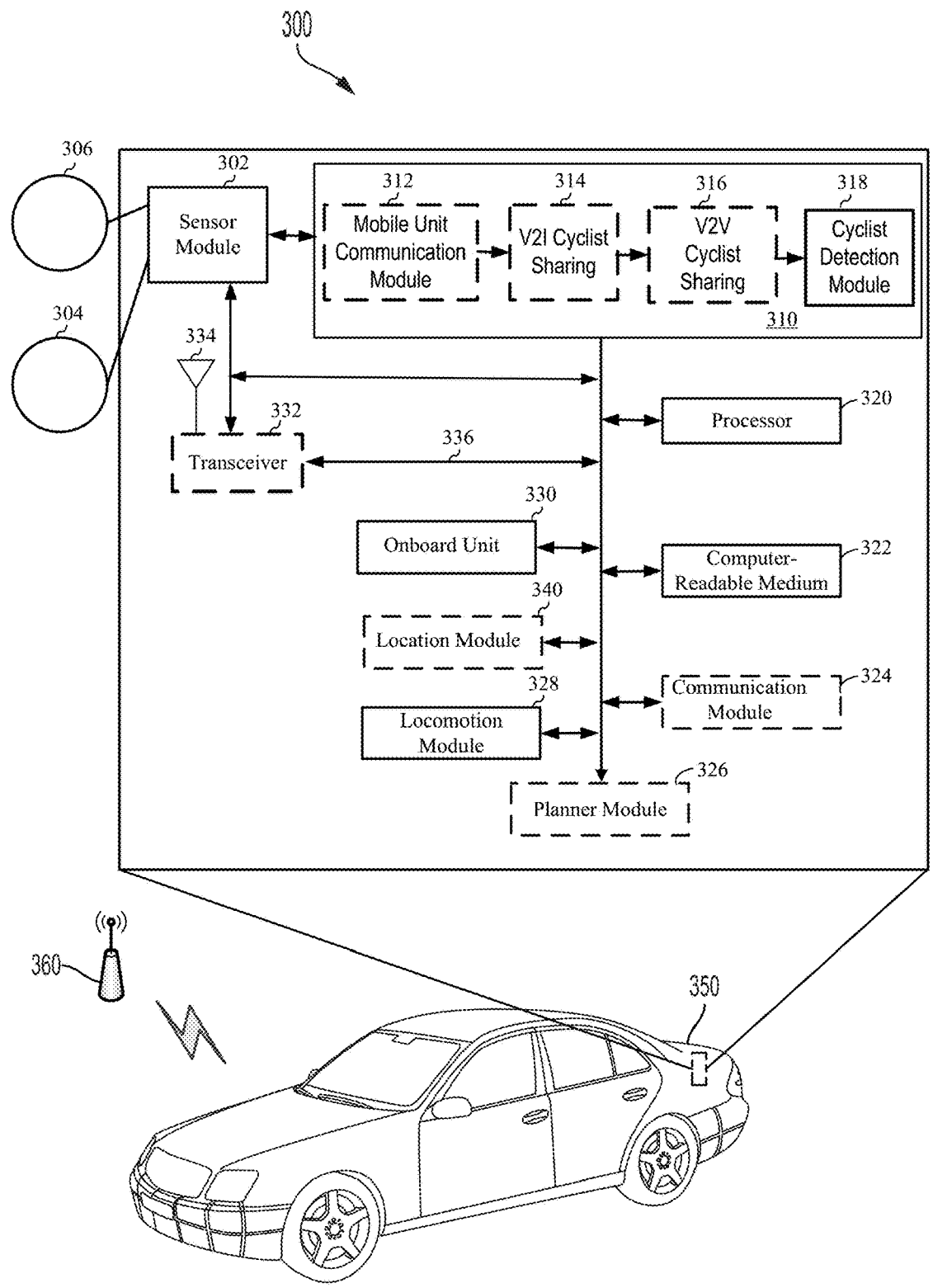
FIG. 3 is a diagram illustrating an example of a hardware implementation for a driver alert system, according to aspects of the present disclosure.

FIG. 3 is a diagram illustrating an example of a hardware implementation for a driver alert system 300, according to aspects of the present disclosure. The driver alert system 300 may be configured to alert a driver when a cyclist is detected near an ego vehicle. The driver alert system 300 may be a component of an ego vehicle, a robotic device, or other device. For example, as shown in FIG. 3, the driver alert system 300 is a component of a car 350. Aspects of the present disclosure are not limited to the driver alert system 300 being a component of the car 350. Other devices, such as a bus, truck, or other like commercial vehicle, are also contemplated for using the driver alert system 300. The car 350 may be autonomous, semi-autonomous, a connected vehicle, or simply include an advanced driver-assistance system (ADAS). Features of the ADAS provide no vehicle control, but may issue warnings to the driver of the car 350.

As noted, the driver alert system 300 may be implemented in a connected vehicle, according to aspects of the present disclosure. Connected vehicle applications enable support for intelligent transportation systems (ITS). In general, ITS are advanced applications integrating telecommunications, electronics, and information technologies to support connected vehicles. ITS applications apply transport engineering to plan, design, operate, maintain, and manage transport systems of a connected vehicle. In particular, these ITS applications provide improved user information and increased safety by coordinating "smarter" use of transport networks.

Connected vehicle applications support vehicle-to-vehicle (V2V) communications and vehicle-to-infrastructure (V2I) with wireless technology. For example V2V communications use wireless signals to send information back and forth between other connected vehicles (e.g., location, speed, and/or direction). Conversely, V2I communications involve vehicle-to-infrastructure communications (e.g., road signs or traffic signals), generally involving vehicle safety issues. For example, V2I communications may request traffic information from a traffic management system to determine best possible routes. V2V and V2I applications for connected vehicles dramatically increase automotive safety by transforming vehicle operation. According to aspects of the present disclosure, V2V and V2I applications are used to exchange detected cyclist information.

The driver alert system 300 may be implemented with an interconnected architecture, represented generally by an interconnect 336. The interconnect 336 may include any number of point-to-point interconnects, buses, and/or bridges depending on the specific application of the driver alert system 300 and the overall design constraints. The interconnect 336 links together various circuits including one or more processors and/or hardware modules, represented by a sensor module 302, an advanced driver-assistance system (ADAS) 310, a processor 320, a computer-readable medium 322, a communication module 324 (optional), a planner module 326 (optional), a locomotion module 328, an onboard unit 330 (optional), and a location module 340 (optional). The interconnect 336 may also link various other circuits such as timing sources, peripherals, voltage regulators, and power management circuits, which are well known in the art, and therefore, will not be described any further.

The driver alert system 300 includes a transceiver 332 (optional) coupled to the sensor module 302, the ADAS 310, the processor 320, the computer-readable medium 322, the communication module 324 (optional), the planner module 326 (optional), the locomotion module 328, the location module 340 (optional), and the onboard unit 330 (optional). The transceiver 332 is coupled to antenna 334 (optional). The transceiver 332 communicates with various other devices over a transmission medium. For example, the transceiver 332 may receive commands via transmissions from a user or a connected vehicle. In this example, the transceiver 332 may transmit cyclist detection information using V2I communication as well as V2V communication from the ADAS 310 to connected vehicles within the vicinity of the car 350.

The driver alert system 300 includes the processor 320 coupled to the computer-readable medium 322. The processor 320 performs processing, including the execution of software stored on the computer-readable medium 322 to provide functionality according to the disclosure. The software, when executed by the processor 320, causes the driver alert system 300 to perform the various functions described for alerting a driver when a cyclist is detected near an ego vehicle, such as the car 350, or any of the modules (e.g., 302, 310, 324, 326, 328, 330, and/or 340). The computer-readable medium 322 may also be used for storing data that is manipulated by the processor 320 when executing the software.

The sensor module 302 may obtain images via different sensors, such as a first sensor 306 and a second sensor 304. The first sensor 306 may be a vision sensor (e.g., a stereoscopic camera or a red-green-blue (RGB) camera) for capturing 2D images. The second sensor 304 may be a ranging sensor, such as a light detection and ranging (LIDAR) sensor or a radio detection and ranging (RADAR) sensor. Of course, aspects of the present disclosure are not limited to the aforementioned sensors as other types of sensors (e.g., thermal, sonar, and/or lasers) are also contemplated for either of the first sensor 306 or the second sensor 304.

The images of the first sensor 306 and the second sensor 304 may be processed by the processor 320, the sensor module 302, the ADAS 310, the communication module 324, the planner module 326 (optional), the locomotion module 328, the onboard unit 330 (optional), and/or the location module 340 (optional). In conjunction with the computer-readable medium 322, the images from the first sensor 306 and the second sensor 304 are processed to implement the functionality described herein. In one configuration, detected cyclist information captured by the first sensor 306 and the second sensor 304 may be transmitted to a connected vehicle via the transceiver 332. The first sensor 306 and the second sensor 304 may be coupled to the car 350 or may be in communication with the car 350.

The location module 340 (optional) may determine a location of the car 350. For example, the location module 340 may use a global positioning system (GPS) to determine the location of the car 350. The location module 340 may implement a dedicated short-range communication (DSRC)-compliant GPS unit. A DSRC-compliant GPS unit includes hardware and software to make the car 350 and/or the location module 340 compliant with one or more of the following DSRC standards, including any derivative or fork thereof: EN 12253:2004 Dedicated Short-Range Communication—Physical layer using microwave at 5.9 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); and EN ISO 14906:2004 Electronic Fee Collection—Application interface.

A DSRC-compliant GPS unit within the location module 340 is operable to provide GPS data describing the location of the car 350 with space-level accuracy for accurately directing the car 350 to a desired location. For example, the car 350 is driving to a predetermined location and desires partial sensor data. Space-level accuracy means the location of the car 350 is described by the GPS data sufficient to confirm a location of the car 350 parking space. That is, the location of the car 350 is accurately determined with space-level accuracy based on the GPS data from the car 350.

The communication module 324 may facilitate communications via the transceiver 332. For example, the communication module 324 may be configured to provide communication capabilities via different wireless protocols, such as Wi-Fi, long term evolution (LTE), 3G, etc. The communication module 324 may also communicate with other components of the car 350 that are not modules of the driver alert system 300. The transceiver 332 may be a communications channel through a network access point 360. The communications channel may include DSRC, LTE, LTE-D2D, mmWave, Wi-Fi (infrastructure mode), Wi-Fi (ad-hoc mode), visible light communication, TV white space communication, satellite communication, full-duplex wireless communications, or any other wireless communications protocol such as those mentioned herein.

In some configurations, the network access point 360 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communications, mmWave, Wi-Fi (infrastructure mode), Wi-Fi (ad-hoc mode), visible light communication, TV white space communication, and satellite communication. The network access point 360 may also include a mobile data network that may include 3G, 4G, 5G, LTE, LTE-V2X, LTE-D2D, VoLTE, or any other mobile data network or combination of mobile data networks. Further, the network access point 360 may include one or more IEEE 802.11 wireless networks.

The driver alert system 300 also includes the planner module 326 for planning a route and controlling the locomotion of the car 350, via the locomotion module 328 for autonomous operation of the car 350. In one configuration, the planner module 326 may override a user input when the user input is expected (e.g., predicted) to cause a collision according to an autonomous level of the car 350. The modules may be software modules running in the processor 320, resident/stored in the computer-readable medium 322, and/or hardware modules coupled to the processor 320, or some combination thereof.

The National Highway Traffic Safety Administration (NHTSA) has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. These different levels of autonomous vehicles are described briefly below.

Level 0: In a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle.

Level 1: In a Level 1 vehicle, the driver is ready to take driving control of the autonomous vehicle at any time. The set of ADAS features installed in the autonomous vehicle may provide autonomous features such as: adaptive cruise control (ACC); parking assistance with automated steering; and lane keeping assistance (LKA) type II, in any combination.

Level 2: In a Level 2 vehicle, the driver is obliged to detect objects and events in the roadway environment and respond if the set of ADAS features installed in the autonomous vehicle fail to respond properly (based on the driver's subjective judgement). The set of ADAS features installed in the autonomous vehicle may include accelerating, braking, and steering. In a Level 2 vehicle, the set of ADAS features installed in the autonomous vehicle can deactivate immediately upon takeover by the driver.

Level 3: In a Level 3 ADAS vehicle, within known, limited environments (such as freeways), the driver can safely turn their attention away from driving tasks, but must still be prepared to take control of the autonomous vehicle when needed.

Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.

Level 5: In a Level 5 vehicle, other than setting the destination and starting the system, no human intervention is involved. The automated system can drive to any location where it is legal to drive and make its own decision (which may vary based on the jurisdiction where the vehicle is located).

A highly autonomous vehicle (HAV) is an autonomous vehicle that is Level 3 or higher. Accordingly, in some configurations the car 350 is one of the following: a Level 0 non-autonomous vehicle; a Level 1 autonomous vehicle; a Level 2 autonomous vehicle; a Level 3 autonomous vehicle; a Level 4 autonomous vehicle; a Level 5 autonomous vehicle; and an HAV.

The ADAS 310 may be in communication with the sensor module 302, the processor 320, the computer-readable medium 322, the communication module 324 (optional), the planner module 326 (optional), the locomotion module 328, the location module 340 (optional), the onboard unit 330 (optional), and the transceiver 332 (optional). In one configuration, the ADAS 310 receives sensor data from the sensor module 302. The sensor module 302 may receive the sensor data from the first sensor 306 and the second sensor 304. According to aspects of the present disclosure, the ADAS 310 may receive sensor data directly from the first sensor 306 and the second sensor 304 to detect, for example, a cyclist in a blind spot (or proximate) the car 350.

As shown in FIG. 3, the ADAS 310 includes a cyclist detection module 318, in addition to optional components, such as a mobile unit communication module 312, a vehicle-to-infrastructure (V2I) cyclist sharing module 314, and a vehicle-to-vehicle (V2V) cyclist sharing module 316. The mobile unit communication module 312, the V2I cyclist sharing module 314, the V2V cyclist sharing module 316, and the cyclist detection module 318 may be components of a same or a different ADAS 310. The ADAS 310 receives a data stream from the first sensor 306 and/or the second sensor 304. The data stream may include a 2D RGB image from the first sensor 306 and LiDAR data points from the second sensor 304. The data stream may include multiple frames, such as image frames, in which a blind spot object may be identified as a cyclist, triggering a warning to the driver of the car 350.

In a connected vehicle configuration of the car 350, the mobile unit communication module 312 may be configured to communicate with other connected vehicles within a proximity of the car 350. For example, the car 350 may receive a cyclist information from a connected vehicle or a third-party application. For example, the third-party application provides location-based tracking services for cyclists, such as indicating the location and/or trajectory of a cyclist to identify and alert the driver of an upcoming cyclist. According to this aspect of the present disclosure, the location and/or the trajectory of a cyclist is processed by the cyclist detection module 318 to alert an operator of the car 350 of the presence of a nearby cyclist. According to a further aspect of the present disclosure, the mobile unit communication module 312 may be configured to list for a radio frequency (RF) beacon (e.g., RF identification (RFID)) to identify nearby cyclists.

During operation of the car 350, the cyclist detection module 318 may identify an object within a vicinity of the car 350. In one aspect of the present disclosure, the cyclist detection module 318 is configured to detect the presence of cyclists in a blind spot of the subject vehicle. As an example, the ADAS 310 may be configured to detect the presence and geometric characteristics (e.g., size) of an object in a blind spot of the car 350 using the first sensor 306 and the second sensor 304 (e.g., a LIDAR sensor, a RADAR sensor, an imaging sensor, etc.)

Figure 6:
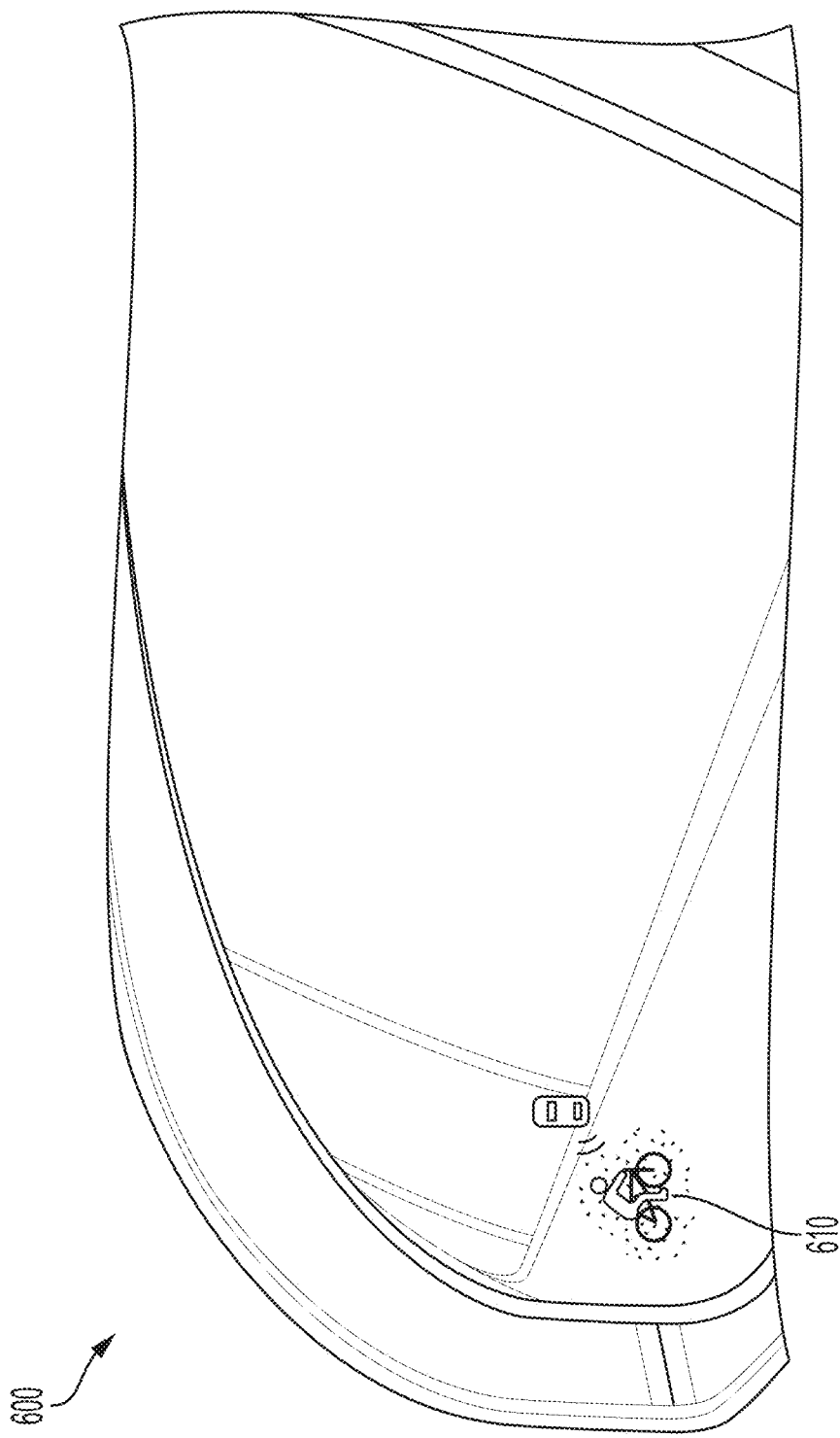
FIG. 6 is a diagrams illustrating passenger side/driver side mirror showing a graphical indication of a cyclist to alert the driver of the cyclist in the blind spot of an ego vehicle, according to aspects of the present disclosure.

Furthermore, the ADAS 310 may be configured to obtain characteristics and/or speed data of the detected object in the blind spot of the car 350. If the speed data and geometric characteristics correspond to the presence of a cyclist, the cyclist detection module 318 may determine that a cyclist is in the blind spot of the car 350 and generate a corresponding alert/indication, for example, as shown in FIG. 6. For example, the ADAS 310 is configured to prevent the car 350 from changing to a right lane and/or turning right while the cyclist is in the passenger side blind spot of the car 350. In addition, The ADAS 310 is configured to prevent a driver side door of the car 350 from opening while the cyclist is in the driver side blind spot of the car 350.

Figure 4:
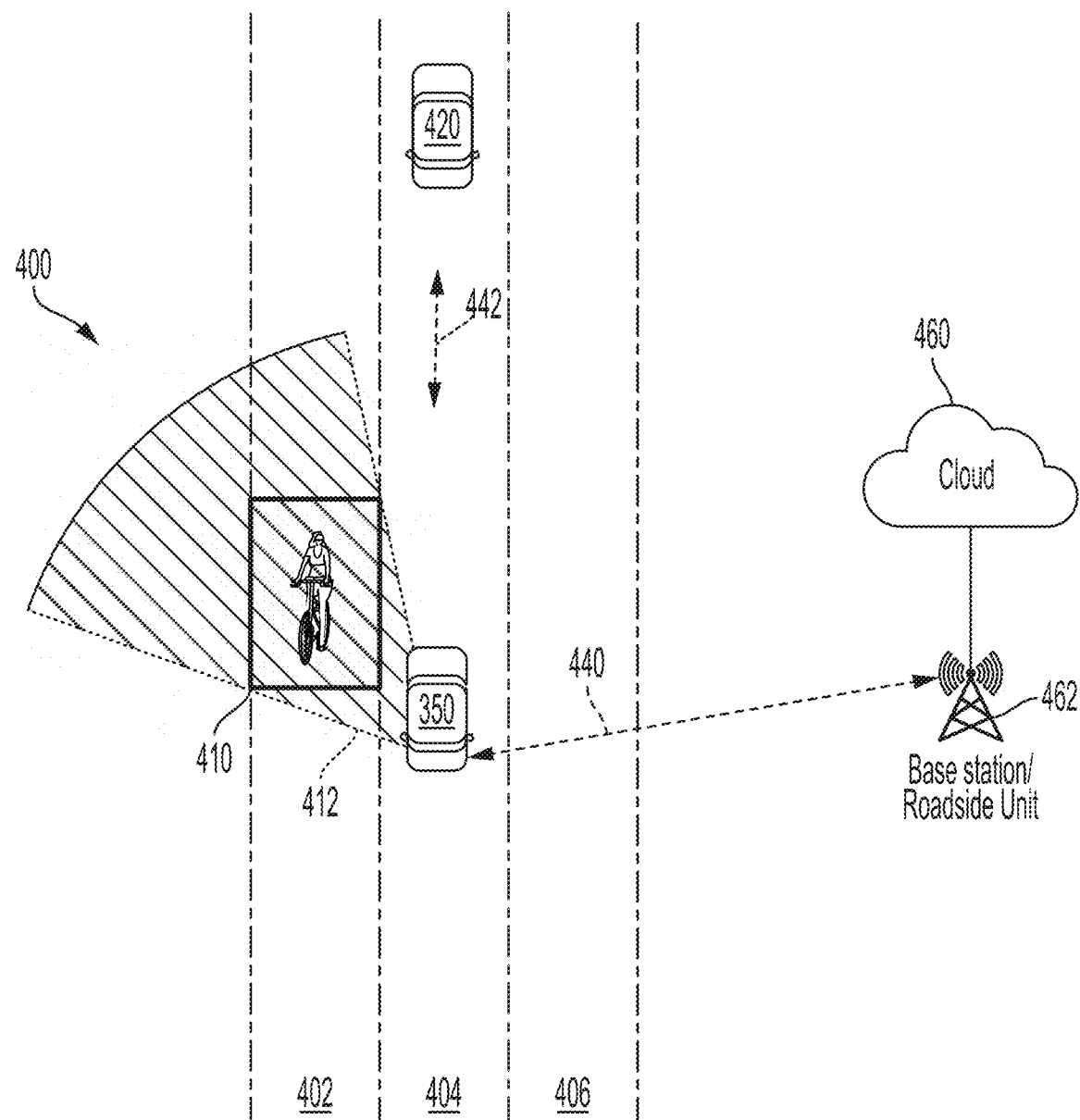
FIG. 4 is a diagram illustrating detection of a cyclist in a blind spot of an ego vehicle and potential sharing of detected cyclist information among connected vehicles, according to aspects of the present disclosure.

FIG. 4 is a diagram illustrating detection of cyclist in a blind spot of an ego vehicle and potential sharing of detected cyclist information among connected vehicles, according to aspects of the present disclosure. In this example, a three-lane highway 400 is shown, including a first lane 402, a second lane 404, and a third lane 406. The first lane 402 includes a cyclist 410, the second lane 404 includes the car 350 and a connected vehicle 420, and the third lane 406 is empty. A blind spot 412 of the car 350 is also shown to include the cyclist 410. By specifically identifying the presence of the cyclist 410 in a blind spot of the car 350, the likelihood of a collision occurring between the cyclist 410 and the car 350 substantially decreases.

As described with reference to FIGS. 3 and 4, the object in the blind spot 412 of the car 350 is initially referred to as a blind spot object, which may be captured through the sensor module 302. In response to the detected blind spot object, the cyclist detection module 318 may be trained to identify the object as the cyclist 410 based on, for example, geometric characteristics (e.g., size) and speed of the blind spot object in the blind spot 412 of the car 350. In response to detecting of the cyclist 410 in the blind spot 412 of the car 350, the cyclist detection module 318 may issue an alert to the driver of the car 350, for example, as shown in FIG. 6. When the car 350 is configured as a highly autonomous vehicle (HAV), that is Level 3 or higher, the car 350 may be prevented from changing lanes or turning right/left in response to detecting of the cyclist 410 in the blind spot 412 of the car 350.

In this aspect of the present disclosure, the car 350 and the connected vehicle 420 are configured as shown in FIG. 3. That is, the car 350 and the connected vehicle 420 are equipped with sensors (e.g., cameras, LIDAR, as shown in FIG. 3) that provide information about surrounding objects. In addition, the car 350 and the connected vehicle 420 are equipped with communication units to exchange cyclist with nearby connected vehicles and/or an infrastructure/cloud network 460. In this example, the V2V sensor sharing module 316 shares detected cyclist information about the cyclist 410 with the connected vehicle 420 over a wireless link 442. This information may be shared with the infrastructure/cloud network 460 over a wireless link 440 to the base station/roadside unit 462. Although FIG. 4 illustrates sharing of cyclist information, it should be recognized that aspects of the present disclosure may omit information sharing.

Figure 5:
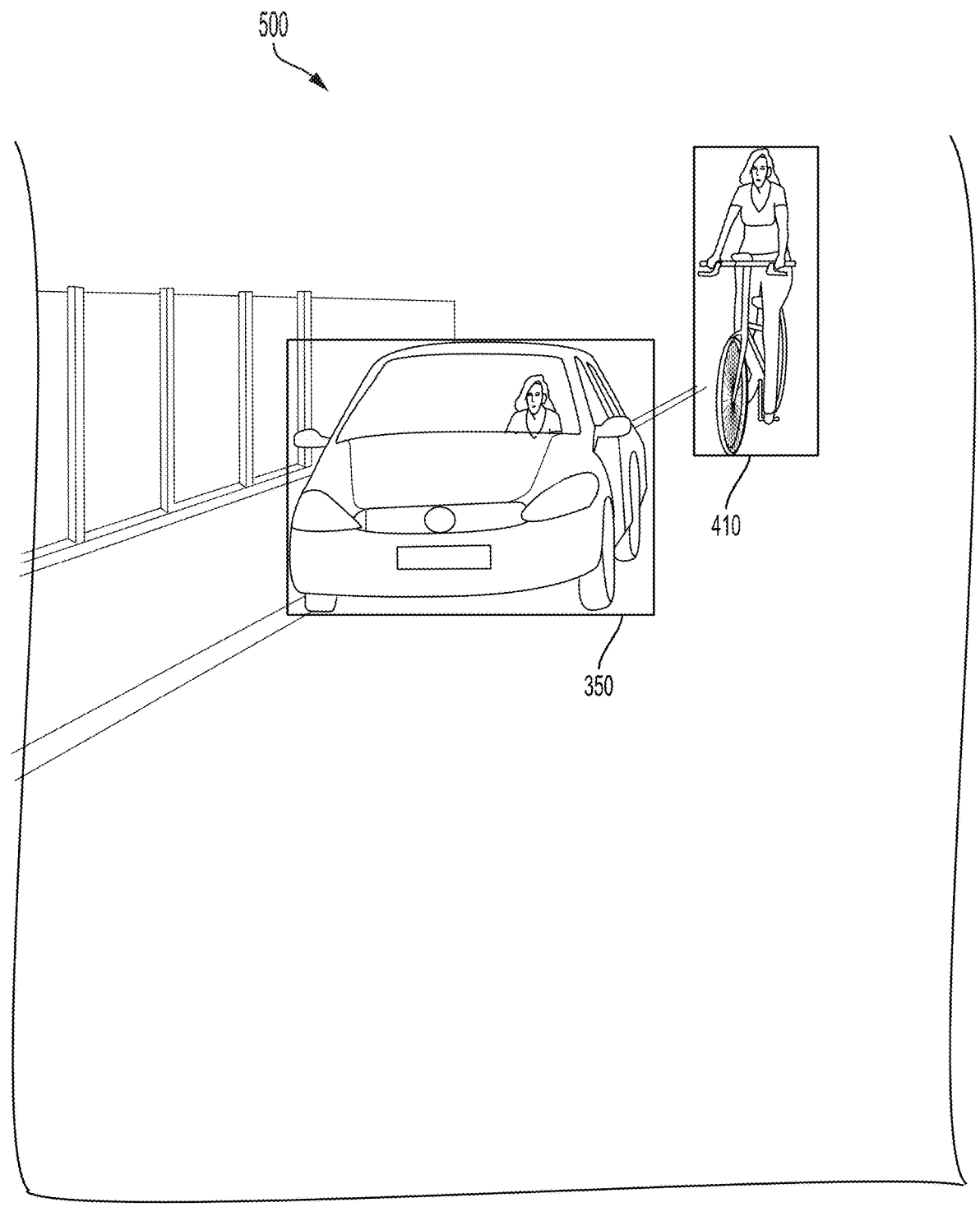
FIG. 5 is a diagram illustrating detection of a cyclist in a driver side blind spot of an ego vehicle, according to aspects of the present disclosure.

FIG. 5 is a diagram illustrating detection of a cyclist in a driver side blind spot of an ego vehicle, according to aspects of the present disclosure. In this example, a highway 500 is shown, in which the car 350 is parked and the driver may be unaware of the cyclist 410 approaching from the driver side of the car 350. As described with reference to FIGS. 3 and 5, a blind spot object proximate the car 350 may be captured through the sensor module 302. In response to the detected blind spot object, the cyclist detection module 318 may be trained to identify the object as the cyclist 410 based on, for example, geometric characteristics (e.g., size) and speed of the blind spot object.

In response to detecting of the cyclist 410 in the driver side blind spot of the car 350, the cyclist detection module 318 may issue an alert to the drive of the car 350, for example, as shown in FIG. 6. When the car 350 is configured as a highly autonomous vehicle (HAV) that is Level 3 or higher, a driver side door and/or a passenger side door of the vehicle may be prevented from opening in response to detecting of the cyclist 410 in the driver side blind spot of the car 350. In aspects of the present disclosure, the mobile unit communication module 312 shares information indicating a location and/or trajectory of the cyclist with a connected vehicle and/or an infrastructure network.

FIG. 6 is a diagram illustrating a passenger side/driver side mirror showing a graphical indication of a cyclist to alert the driver of the cyclist in the blind spot of an ego vehicle, according to aspects of the present disclosure. In this aspect of the present disclosure, an alert/indication is generated by the cyclist detection module to represent the presence of the cyclist 410. In this example, a driver side/passenger side mirror 600 of the subject vehicle may generate a graphical indication 610 corresponding to a cyclist in response to detecting the cyclist 410 in the blind spot 412 of the car 350 as shown in FIG. 4. In the example of FIG. 4, the driver side/passenger side mirror 600 is a passenger side mirror, including the graphical indication 610 in response to detecting the cyclist 410 in the blind spot 412 (e.g., passenger side blind spot) of the car 350. In the example of FIG. 5, the driver side/passenger side mirror 600 is a driver side mirror, including the graphical indication 610 in response to detecting the cyclist 410 in the blind spot 412 (e.g., a driver side blind spot) of the car 350.

Figure 7:
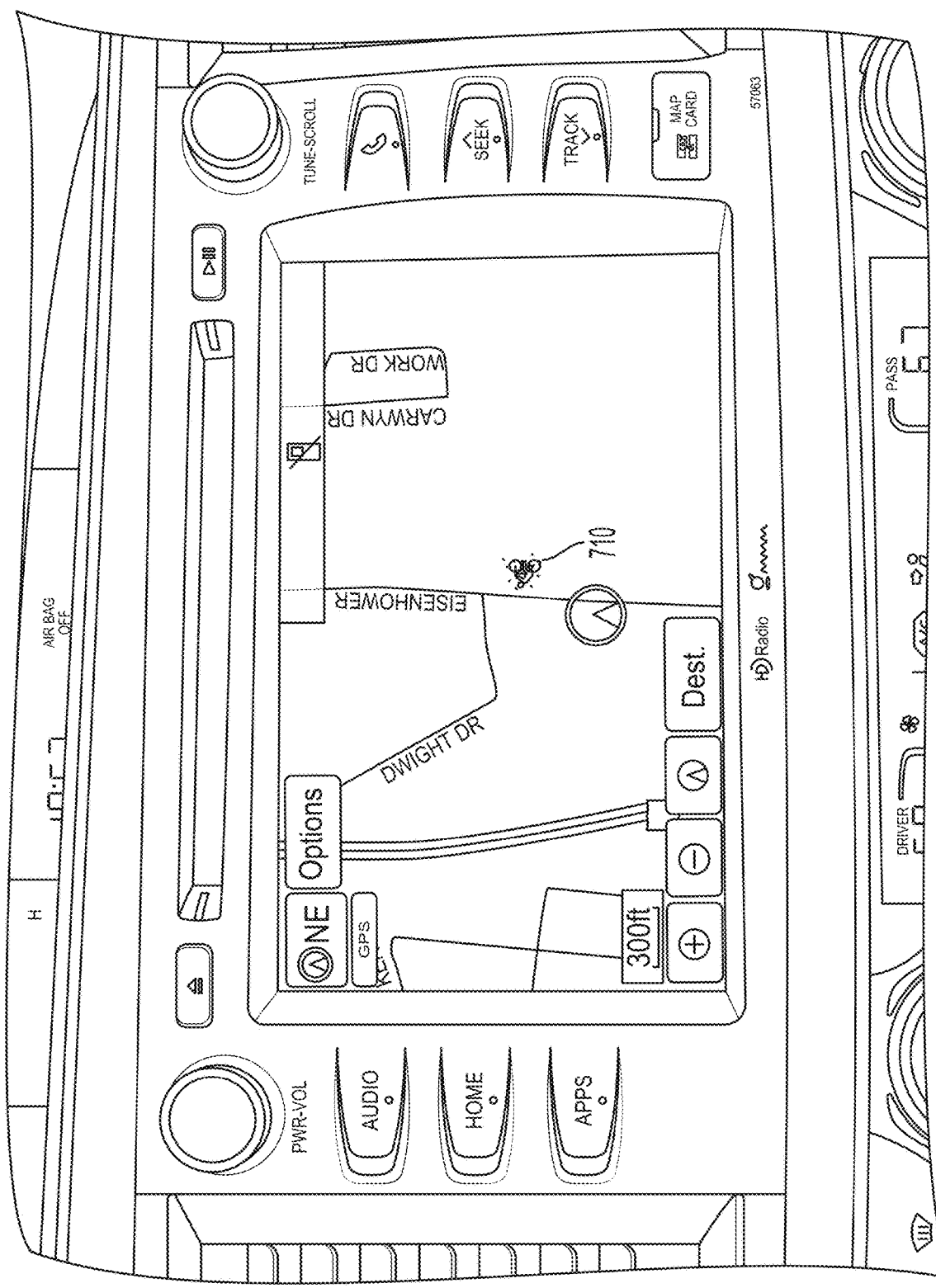
FIG. 7 is illustrating a heads-up display (HUD) showing a graphical indication of a cyclist to alert the driver of the cyclist in the proximity of an ego vehicle, according to aspects of the present disclosure.

FIG. 7 is a illustrating a heads-up display (HUD) 700 showing a graphical indication of a cyclist to alert the driver of the cyclist in the proximity of an ego vehicle, according to aspects of the present disclosure. In this aspect of the present disclosure, third-party application information indicating the location and/or trajectory of a cyclist is acquired to identify and alert a driver of an upcoming bicyclist. In this aspect of the present disclosure, the car 350 may be configured to obtain third-party application information indicating the location and/or trajectory of one or more cyclists. By comparing the obtained application information to the location information of the ego vehicle (e.g., global positioning system (GPS) coordinates) and/or trajectory information of the ego vehicle, the cyclist detection module 318 can determine whether the car 350 is nearby and/or approaching one or more cyclists.

In response to determining that the ego vehicle is nearby and/or approaching one or more cyclists, a display system of the vehicle (e.g., a heads-up display (HUD) may generate a graphical indication/alert 710 showing an upcoming cyclist. In this example, cyclist information is incorporated into the HUD 700 as part of the ADAS 310 of the car 350. By identifying the presence of the upcoming cyclists with graphical indication/alert 710, the likelihood that a collision will occur between a cyclist and the ego vehicle substantially decreases. In one configuration, GPS information regarding detected cyclists may be used by the ADAS 310 to identify a blind spot object as a cyclist depending on the GPS coordinates and trajectory of the car 350.

Figure 8:
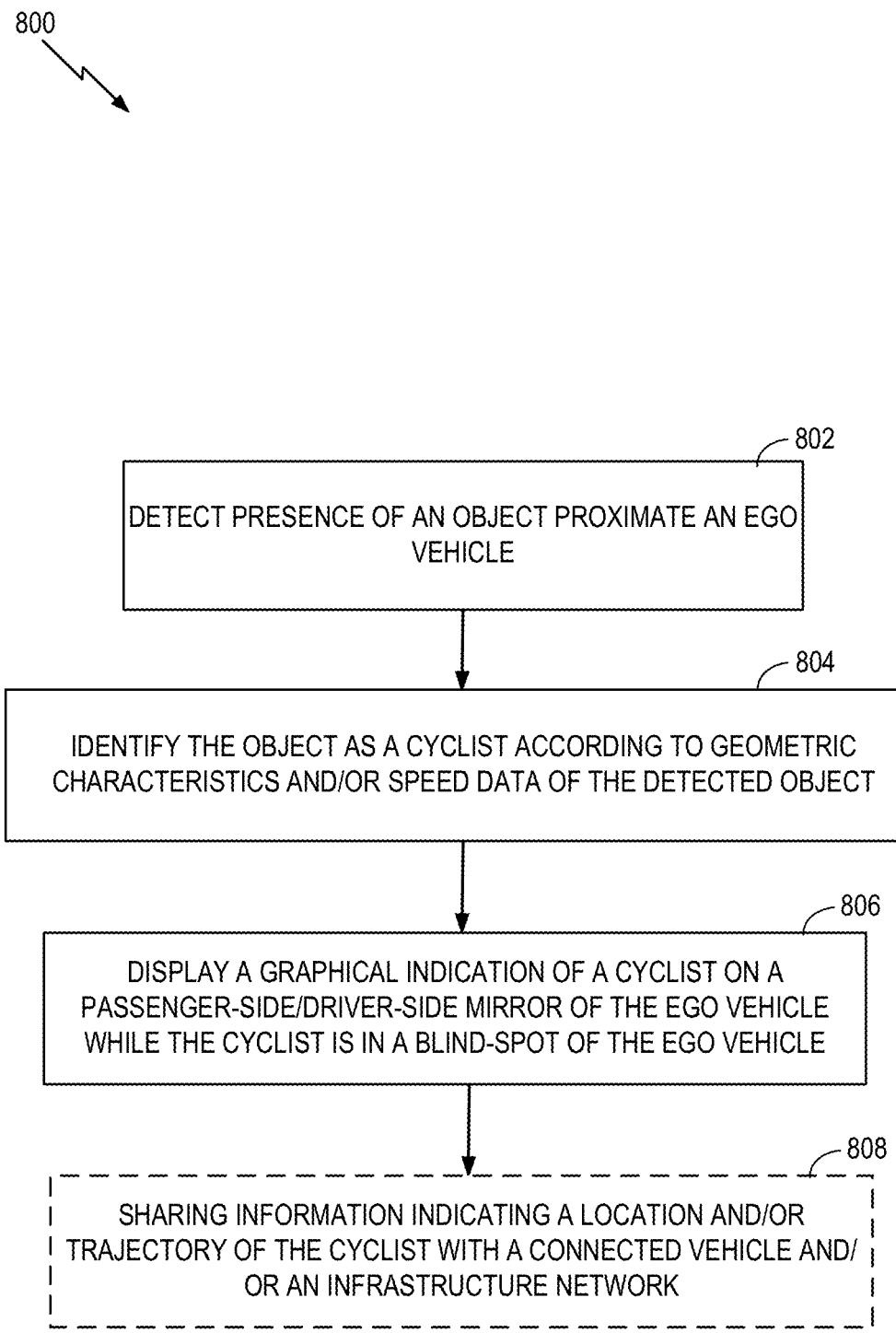
FIG. 8 is a flowchart illustrating a method for alerting a driver when a cyclist is detected near an ego vehicle, according to aspects of the present disclosure.

FIG. 8 is a flowchart illustrating a method for alerting a driver when a cyclist is detected near an ego vehicle, according to aspects of the present disclosure. The method 800 begins at block 802, in which the presence of an object proximate an ego vehicle is detected. For example, shown in FIG. 4, a blind spot object (e.g., cyclist 410) proximate the car 350 may be captured through the sensor module 302. At block 804, the object is identified as a cyclist according to geometric characteristics and/or speed data of the detected object.

At block 806, a graphical indication of a cyclist is displayed on a passenger side/driver side mirror of the ego vehicle while the cyclist is in a blind spot of the ego vehicle. For example, a driver side/passenger side mirror 600 of the car 350 may generate a graphical indication 610 corresponding to a cyclist in response to detecting the cyclist 410 in the blind spot 412 of the car 350 as shown in FIG. 4. At optional block 808, information indicating a location and/or trajectory of the cyclist is shared with a connected vehicle and/or an infrastructure network, for example, as shown in FIG. 4. Sharing cyclist information with other connected vehicles increases awareness of and safety of nearby cyclists sharing the road with other connected vehicles.

In some aspects of the present disclosure, the method 800 may be performed by the SOC 100 (FIG. 1) or the software architecture 200 (FIG. 2) of the ego vehicle 150 (FIG. 1). That is, each of the elements of method 800 may, for example, but without limitation, be performed by the SOC 100, the software architecture 200, or the processor (e.g., CPU 102) and/or other components included therein of the ego vehicle 150.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules, and circuits described in connection with the present disclosure may be implemented or performed with a processor configured according to the present disclosure, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. The processor may be a microprocessor, but in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout the present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc; where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for alerting a driver when a bicyclist is detected near an ego vehicle, the method comprising:
    receiving bicyclist information indicating a current location and a trajectory of a bicyclist detected by a connected vehicle and received using vehicle to vehicle (V2V) communication;
    detecting a presence of an object proximate the ego vehicle;
    identifying the object as the bicyclist according to geometric characteristics and speed data of the detected object based on the received bicyclist information indicating the current location and the trajectory of the bicyclist detected by the connected vehicle; and
    displaying a bicyclist symbol of the identified bicyclist on a passenger side/driver side mirror of the ego vehicle while the identified bicyclist is in a blind spot of the ego vehicle.

2. The method of claim 1, in which detecting the presence of the object comprises capturing image data of the detected object in the blind spot of the ego vehicle.

3. The method of claim 1, in which identifying the detected object as the bicyclist comprises:
    obtaining information indicating a location and/or trajectory of one or more bicyclists;
    comparing the obtained application information to a location information of the ego vehicle and/or trajectory information of the ego vehicle;
    determining whether the ego vehicle is nearby and/or approaching the one or more bicyclists.

4. The method of claim 1, in which displaying further comprises displaying the bicyclist symbol on the passenger side mirror of the ego vehicle when the bicyclist is detected in a passenger side blind spot of the ego vehicle.

5. The method of claim 4, further comprising preventing the ego vehicle from changing to a right lane and/or turning right while the bicyclist is in the passenger side blind spot of the ego vehicle.

6. The method of claim 1, in which displaying further comprises displaying the bicyclist symbol on a driver side mirror of the ego vehicle when the bicyclist is detected in a driver side blind spot of the ego vehicle.

7. The method of claim 6, further comprising preventing a driver side door of the ego vehicle from opening while the bicyclist is in the driver side blind spot of the ego vehicle.

8. The method of claim 1, further comprising displaying the bicyclist symbol of the bicyclist on a heads-up display (HUD) of the ego vehicle to alert the driver of the bicyclist in a proximity of the ego vehicle.

9. The method of claim 1, in which detecting the presence of the object comprises detecting a radio frequency (RF) beacon emitted by the object.

10. A non-transitory computer-readable medium having program code recorded thereon for alerting a driver when a bicyclist is detected near an ego vehicle, the program code being executed by a processor and comprising:

program code to receive bicyclist information indicating a current location and a trajectory of a bicyclist detected by a connected vehicle and received using vehicle to vehicle (V2V) communication;

program code to detect a presence of an object proximate the ego vehicle;

program code to identify the object as the bicyclist according to geometric characteristics and speed data of the detected object based on the received bicyclist information indicating the current location and the trajectory of the bicyclist detected by the connected vehicle; and program code to display a bicyclist symbol of the identified bicyclist on a passenger side/driver side mirror of the ego vehicle while the identified bicyclist is in a blind spot of the ego vehicle.

11. The non-transitory computer-readable medium of claim 10, in which the program code to detect the presence of the object comprises program code to capture image data of the detected object in the blind spot of the ego vehicle.

12. The non-transitory computer-readable medium of claim 10, in which the program code to identify the detected object as the bicyclist comprises:

program code to obtain information indicating a location and/or trajectory of one or more bicyclists;

program code to compare the obtained application information to a location information of the ego vehicle and/or trajectory information of the ego vehicle;

program code to determine whether the ego vehicle is nearby and/or approaching one or more bicyclists.

13. The non-transitory computer-readable medium of claim 10, in which the program code to display further comprises:

program code to display the bicyclist symbol of the identified bicyclist on the passenger side mirror of the ego vehicle when the identified bicyclist is detected in a passenger side blind spot of the ego vehicle; and program code to display the bicyclist symbol of the identified bicyclist on a driver side mirror of the ego vehicle when the identified bicyclist is detected in a driver side blind spot of the ego vehicle.

14. The non-transitory computer-readable medium of claim 13, further comprising:

program code to prevent the ego vehicle from changing to a right lane and/or turning right while the identified bicyclist is in the passenger side blind spot of the ego vehicle; and program code to prevent a driver side door of the ego vehicle from opening while the identified bicyclist is in the driver side blind spot of the ego vehicle.

15. The non-transitory computer-readable medium of claim 10, further comprising program code to display the bicyclist symbol of the identified bicyclist on a heads-up display (HUD) of the ego vehicle to alert the driver of the identified bicyclist in a proximity of the ego vehicle.

16. The non-transitory computer-readable medium of claim 10, in which the program code to detect the presence of the object comprises program code to detect a radio frequency (RF) beacon emitted by the object.

17. A system for alerting a driver when a bicyclist is detected near an ego vehicle, the system comprising:

an onboard unit to receive bicyclist information indicating a current location and a trajectory of a bicyclist detected by a connected vehicle and received using vehicle to vehicle (V2V) communication;

a bicyclist detection module to detect a presence of an object proximate the ego vehicle and to identify the object as the bicyclist according to geometric characteristics and speed data of the detected object based on the received bicyclist information indicating the current location and the trajectory of the bicyclist detected by the connected vehicle; and an advanced driver-assistance system (ADAS) to display a bicyclist symbol of the identified bicyclist on a passenger side/driver side mirror of the ego vehicle while the identified bicyclist is in a blind spot of the ego vehicle.

18. The system of claim 17, further comprising a heads-up display (HUD) to display the bicyclist symbol of the bicyclist to alert the driver of the bicyclist in a proximity of the ego vehicle.

* * * * *